US008880088B2

(12) United States Patent
Wigren et al.

(10) Patent No.: US 8,880,088 B2
(45) Date of Patent: Nov. 4, 2014

(54) SIGNALLING FOR INTERFERENCE MANAGEMENT IN HETNETS

(75) Inventors: Torbjörn Wigren, Uppsala (SE); Lana Siomina, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/376,524

(22) PCT Filed: Dec. 1, 2011

(86) PCT No.: PCT/SE2011/051467
§ 371 (c)(1),
(2), (4) Date: Dec. 6, 2011

(87) PCT Pub. No.: WO2012/078095
PCT Pub. Date: Jun. 14, 2012

(65) Prior Publication Data
US 2013/0242744 A1 Sep. 19, 2013

Related U.S. Application Data

(60) Provisional application No. 61/421,754, filed on Dec. 10, 2010.

(51) Int. Cl.
H04W 72/00 (2009.01)
H04W 28/02 (2009.01)
H04W 24/02 (2009.01)
H04W 36/20 (2009.01)
H04W 72/12 (2009.01)
H04W 36/22 (2009.01)
H04W 16/32 (2009.01)

(52) U.S. Cl.
CPC .......... *H04W 28/0236* (2013.01); *H04W 36/20* (2013.01); *H04W 72/1231* (2013.01); *H04W 36/22* (2013.01); *H04W 16/32* (2013.01); *H04W 24/02* (2013.01)
USPC .................................................... 455/452.2

(58) Field of Classification Search
USPC ................ 455/452.2, 446, 448, 443, 453
See application file for complete search history.

(56) References Cited

U.S. PATENT DOCUMENTS 8,135,349 B2 * 3/2012 Hwang et al. ................ 455/63.1
8,605,842 B2 * 12/2013 Wigren ......................... 375/346

(Continued)

FOREIGN PATENT DOCUMENTS

EP       2053758 A1    4/2009
WO    2008039123 A1    4/2008

(Continued)

OTHER PUBLICATIONS

Thomas, J., et al., "Iterative MMSE Multiuser Interference Suppression for Coded Dispersive CDMA Wireless Channels with Multisensor Receivers", Conference Record of the Thirty-Third Asilomar Conference on Signals, Systems, and Computers, vol. 1, pp. 225-230, Oct. 24-27, 1999, Copyright 1999 IEEE.

(Continued)

*Primary Examiner* — Brandon Miller
(74) *Attorney, Agent, or Firm* — Coats & Bennett, P.L.L.C.

(57) ABSTRACT

The method and apparatus disclosed herein enable interference suppressed information (information about interference after interference suppression to be provided to the Radio Network Controller (RNC) and/or to surrounding Radio Base Stations (RBSs)), thereby providing better radio resource management for hot spots and/or allowing the RBSs to better understand their impact on surrounding cells. Generally, a network node in the wireless network signals interference suppressed information, e.g., an interference suppressed load or overload indicator, an interference suppressed neighbor cell interference, and/or an interference suppressed noise floor to a remote node in the wireless network to facilitate radio resource management. Further, a radio network controller in the wireless network may manage the interference in cells based on the interference suppressed information by generating an interference management instruction based on the interference suppressed information, and sending the interference management instruction to the radio base station to control one or more interference management settings, e.g., a power control setting, a load threshold, etc.

31 Claims, 17 Drawing Sheets

(56) References Cited

U.S. PATENT DOCUMENTS

| | | | | |
|---|---|---|---|---|
| 8,665,937 | B2* | 3/2014 | Wigren | 375/227 |
| 8,670,478 | B2* | 3/2014 | Kangas et al. | 375/144 |
| 8,717,924 | B2* | 5/2014 | Wigren et al. | 370/252 |
| 2002/0071508 | A1 | 6/2002 | Takada et al. | |
| 2009/0052564 | A1* | 2/2009 | Hayashi et al. | 375/260 |
| 2009/0088080 | A1 | 4/2009 | Zhang et al. | |
| 2009/0207746 | A1 | 8/2009 | Yuan et al. | |
| 2010/0214964 | A1 | 8/2010 | Larsson et al. | |
| 2011/0195731 | A1* | 8/2011 | Jang et al. | 455/501 |
| 2012/0076248 | A1* | 3/2012 | Rosenqvist | 375/346 |

FOREIGN PATENT DOCUMENTS

| | | |
|---|---|---|
| WO | 2008097145 A1 | 8/2008 |
| WO | 2008119216 A1 | 10/2008 |
| WO | 2011031193 A1 | 3/2011 |
| WO | 2012074475 A1 | 6/2012 |

OTHER PUBLICATIONS

Cairns, D. et al., "Experimental Evaluation of Interference Cancellation for Dual-Antenna UMTS Handset," IEEE, 2005, pp. 877-881.

Ahmed, Mohamed Hossam, "Call Admission Control in Wireless Networks: A Comprehensive Survey", IEEE Communications Surveys, IEEE, New York, NY,First Quarter 2005, vol. 7, No. 1, Jan. 1, 2005, pp. 50-69, XP011290930.

Dahlman, E., et al., Wider-band "single-carrier" transmission, 3G Evolution, Second Edition, 2008, Chapter 5, p. 65, HSPA and LTE for Mobile Broadband, Elsevier Ltd.

Wigren, T., et al., "Estimation of uplink WCDMA load in a single RBS", 66th IEEE Vehicular Technology Conference, Sep. 30, 2007, pp. 1-5, IEEE.

Wigren, T., "Soft Uplink Load Estimation in WCDMA", IEEE Transactions on Vehicular Technology, Feb. 1, 2009, pp. 760-772, vol. 58, No. 2, IEEE.

3rd Generation Partnership Project, "3rd Generation Partnership Project; Technical Specification Group Radio Access Network; Requirements for support of radio resource management (FDD) (Release 6)", Technical Specification, 3GPP TS 25.133 V6.10.0, Jun. 1, 2005, pp. 1-164, 3GPP, France.

Wigren, T., "Recursive Noise Floor Estimation in WCDMA", IEEE Transactions on Vehicular Technology, Jun. 1, 2010, pp. 2615-2620, vol. 59, No. 5, IEEE.

Lops, M., et al., "Narrow-Band-Interference Suppression in Multiuser CDMA Systems", IEEE Transactions on Communications, Sep. 1, 1998, pp. 1163-1175, vol. 46, No. 9, IEEE.

Tan, A., et al., "Modeling the Effects of Interference Suppression Filters on Ultra-Wideband Pulses", IEEE Transactions on Microwave Theory and Techniques, Jan. 1, 2011, pp. 93-98, vol. 59, issue 1, IEEE Microwave Theory and Techniques Society.

3rd Generation Partnership Project, "3rd Generation Partnership Project; Technical Specification Group Services and System Aspects; General Packet Radio Service (GPRS); Service description; Stage 2 (Release 10)", Technical Specification, 3GPP TS 23.060 V10.5.0, Sep. 1, 2011, pp. 1-321, 3GPP, France.

3rd Generation Partnership Project, "3rd Generation Partnership Project; Technical Specification Group Radio Access Network; Physical layer; Measurements (FDD) (Release 10)", Technical Specification, 3GPP TS 25.215 V10.1.0, Mar. 1, 2011, pp. 1-23, 3GPP, France.

3rd Generation Partnership Project, "3rd Generation Partnership Project; Technical Specification Group Radio Access Network; Physical layer; Measurements (TDD) (Release 10)", Technical Specification, 3GPP TS 25.225 V10.1.0, Jun. 1, 2011, pp. 1-30, France.

3rd Generation Partnership Project, "3rd Generation Partnership Project; Technical Specification Group Services and System Aspects; General Packet Radio Service (GPRS) enhancements for Evolved Universal Terrestrial Radio Access Network (E-UTRAN) access (Release 10)", Technical Specification, 3GPP TS 23.401 V10.5.0, Sep. 1, 2011, pp. 1-282, 3GPP, France.

3rd Generation Partnership Project, "3rd Generation Partnership Project; Technical Specification Group Radio Access Network; UTRAN Iub interface Node B Application Part (NBAP) signalling (Release 10)", Technical Specification, 3GPP TS 25.433 V10.4.0, Sep. 1, 2011, pp. 1-1276, 3GPP, France.

3rd Generation Partnership Project, "3rd Generation Partnership Project; Technical Specification Group Radio Access Network; UTRAN Iur interface Radio Network Subsystem Application Part (RNSAP) signalling (Release 10)", Technical Specification, 3GPP TS 25.423 V10.4.0, Sep. 1, 2011, pp. 1-567, 3GPP, France.

* cited by examiner

200
SIGNALLING FOR INTERFERENCE MANAGEMENT IN HETNETS

This application claims priority to U.S. Provisional Patent Application 61/421,754 filed 10 Dec. 2010, and claims priority to PCT Application PCT/SE2011/051467, filed 1 Dec. 2011, both of which are incorporated herein by reference.

The present invention relates generally to signaling information between network nodes, e.g., between a Radio Base Station (RBS) and a Radio Network Controller (RNC), and more particularly relates to signaling of information about the interference after suppression information to facilitate network management operations, particularly those in heterogeneous networks (HETNETs).

BACKGROUND

There has been an increased interest in recent years in deploying low-power nodes, e.g., pico, micro, and femto base stations as well as relay nodes, home NodeBs/eNodeBs, relays, remote radio heads, etc., to enhance the macro network performance of the wireless network in terms of the network coverage, capacity, and service experience of individual users. With the increased interest in such deployments has come the realization that there is a need for enhanced interference management techniques to address the arising interference issues caused, for example, by the transmit power variations among different cells. In the past, such interference management techniques have not been necessary because lower-power nodes have generally been used for indoor environments, and therefore, have been isolated from most forms of interference. Thus, conventional radio resource management techniques do not consider information about the interference after suppression, referred to herein as interference suppressed information. For example, indoor environments generally experience good isolation from interference caused by macro-layer transmissions. However, lower-power nodes are now being considered for outdoor environments, and for capacity enhancement in general, where interference management is more critical.

Heterogeneous networks, where low-power nodes of different transmit powers are placed throughout a macro-cell layout to cope with nonuniform traffic distribution, have been subject to standardization in 3GPP. Deployment of such technology is effective for capacity extension in certain areas, e.g., small geographical areas with higher user density and/or higher traffic intensity known as traffic hot spots. Further, heterogeneous deployments may also be used to adopt the wireless network to the traffic needs and the environment. However, the mix of all of these different nodes introduces interaction between the cells in new ways, e.g., reuse-one networks where the inter-cell isolation is poor.

To address this interaction, some types of mobile communication systems, such as Wideband Code Division Multiple Access (WCDMA) systems, may use interference suppression (IS) to achieve better performance in terms of peak data rates, coverage, system throughput, and system capacity. Examples of commonly used interference suppressing receivers include the G-rake+ receiver, the Frequency Domain Equalizer (FDE) receiver, and the Frequency Domain Pre-Equalize (FDPE) receiver. As future wireless networks become more heterogeneous in terms of wireless devices, deployed radio network nodes, traffic demand, service types, radio access technologies, etc., incorporating such interference suppression with network management operations becomes increasingly important. However, the air interface load interaction, e.g., the effects of the interference created in one cell for the surrounding cells, becomes particularly difficult in WCDMA heterogeneous networks equipped with interference suppression receivers. Appendix A provides some details regarding existing technologies in this area.

To illustrate, consider a low power cell with limited coverage intended to serve a traffic hotspot, where the low-power cell is located in the interior and at the boundary of a specific macro cell. In this case, the low-power cell may use an interference suppression receiver, e.g., a G-RAKE+ receiver, to provide sufficient coverage for the hot spot. Surrounding macro cells interfere with the low-power cell, rendering a high level of neighbor cell interference in the low power cell that does not allow coverage of the hotspot, despite the use of an advanced IS receiver. Such interference only increases when transmissions in the low-power cells are at the maximum power level. As a result, the users of the hot spot are connected to the surrounding macro cells, which further increase the neighbor cell interference experienced by the low-power cell.

Recent work by the inventors of the present application has provided ways to estimate various types of interference suppressed information, e.g., interference suppressed neighbor cell interference. However, there are currently no provisions for signaling such interference suppressed information between an RBS and an RNC, between two RNCs, etc. Further, there are currently no provisions for radio resource management using such interference suppressed information. Thus, there remains a need for further network management options based on interference suppressed information.

SUMMARY

The solution disclosed herein addresses these problems by providing a method and apparatus that enable interference suppressed information comprising information about the interference after suppression to be provided to the RNC and/or to surrounding radio network nodes, e.g., Radio Base Stations (RBSs) and/or Location Management Units (LMUs), thereby providing better radio resource management for hot spots and/or allowing the RBSs to better understand their impact on surrounding cells. Generally, a network node in the wireless network signals interference suppressed information, e.g., an interference suppressed load or interference suppressed overload indicator, an interference suppressed neighbor cell interference, and/or an interference suppressed noise floor to a remote node in the wireless network to facilitate radio resource management. Further, a radio network controller in the wireless network may manage the interference suppressed information by generating an interference management instruction based on the interference suppressed information, and sending the interference management instruction to the radio network node to control one or more interference management settings. Exemplary interference management instructions include but are not limited to power setting instructions, admission control instructions, congestion control instructions, scheduling instructions, handover instructions, load balancing instructions, etc.

One exemplary embodiment provides a network node configured to signal interference suppressed information to one or more remote nodes in a wireless network. Accordingly, the network node comprises an information unit and a signaling unit. The information unit determines the interference suppressed information comprising at least one of an interference suppressed load or interference suppressed overload indicator, an interference suppressed neighbor cell interference, and an interference suppressed noise floor associated with a radio network node (e.g., an RBS or an LMU) in the wireless network. For example, when the network node comprises a radio base station, the information unit determines the interference suppressed information by suppressing interference from a received signal and determining the interference suppressed information from the interference-suppressed signal. Alternatively, when the network node comprises a radio network controller, the information unit determines the interference suppressed information by requesting and receiving the interference suppressed information from the radio base station. In any event, the signaling unit signals the interference suppressed information to a remote node in the wireless network, e.g., a radio network controller, a radio base station, etc., via an interface communicatively coupling the network node to the remote node.

Another exemplary embodiment provides a method of signaling interference suppressed information between network nodes in a wireless network. The method comprises determining the interference suppressed information comprising at least one of an interference suppressed load or interference suppressed overload indicator, an interference suppressed neighbor cell interference, and an interference suppressed noise floor associated with a base station in the wireless network. The method further comprises signaling the interference suppressed information to a remote network node in the wireless network via an interface communicatively coupling the network node to the remote network node.

In another exemplary embodiment, a management node manages interference suppressed information in a wireless network, where the management node comprises a receiver, a processor, and a signaling unit. The receiver receives interference suppressed information comprising at least one of an interference suppressed load or interference suppressed overload indicator, an interference suppressed neighbor cell interference, and an interference suppressed noise floor associated with a first base station in the wireless network from the first base station. The processor processes the interference suppressed information to generate an interference management instruction. The signaling unit signals the interference management instruction to one or more base stations in the wireless network.

According to an exemplary method of managing interference suppressed information in a wireless network, interference suppressed information is received, where the interference suppressed information comprises at least one of an interference suppressed load or interference suppressed overload indicator, an interference suppressed neighbor cell interference, and an interference suppressed noise floor associated with a first base station in the wireless network from the base station. The method further includes processing the interference suppressed information to generate an interference management instruction, and signaling the interference management instruction to one or more base stations in the wireless network to control one or more interference management control settings at each of the one or more base stations.

DETAILED DESCRIPTION

The methods and apparatus disclosed herein enable interference suppressed information to be provided to the Radio Network Controller (RNC) and/or to surrounding Radio Base Stations (RBSs) and/or Location Management Units (LMUs) to provide better management of traffic hot spot operations and/or to allow the RBSs to better understand their impact on surrounding cells. As used herein, the term "interference suppressed information" refers to information about the interference after interference suppression, such as may be provided by a G-RAKE+, a Frequency-Domain Equalizer (FDE), a Frequency-Domain Pre-Equalizer (FDPE), etc., and includes e.g., an interference suppressed load or interference suppressed overload indicator, an interference suppressed neighbor cell interference, and/or an interference suppressed noise floor. Generally, a network node in the wireless network signals the interference suppressed information to a remote node in the wireless network. When the network node comprises an RNC, the RNC may also manage the RBS/LMU operations by generating an interference management instruction based on the interference suppressed information, and send the interference management instruction to an RBS/LMU to control one or more interference management settings. Exemplary interference management instructions include but are not limited to power setting instructions, admission control instructions, congestion control instructions, scheduling instructions, handover instructions, load balancing instructions, etc.

Figure 1:
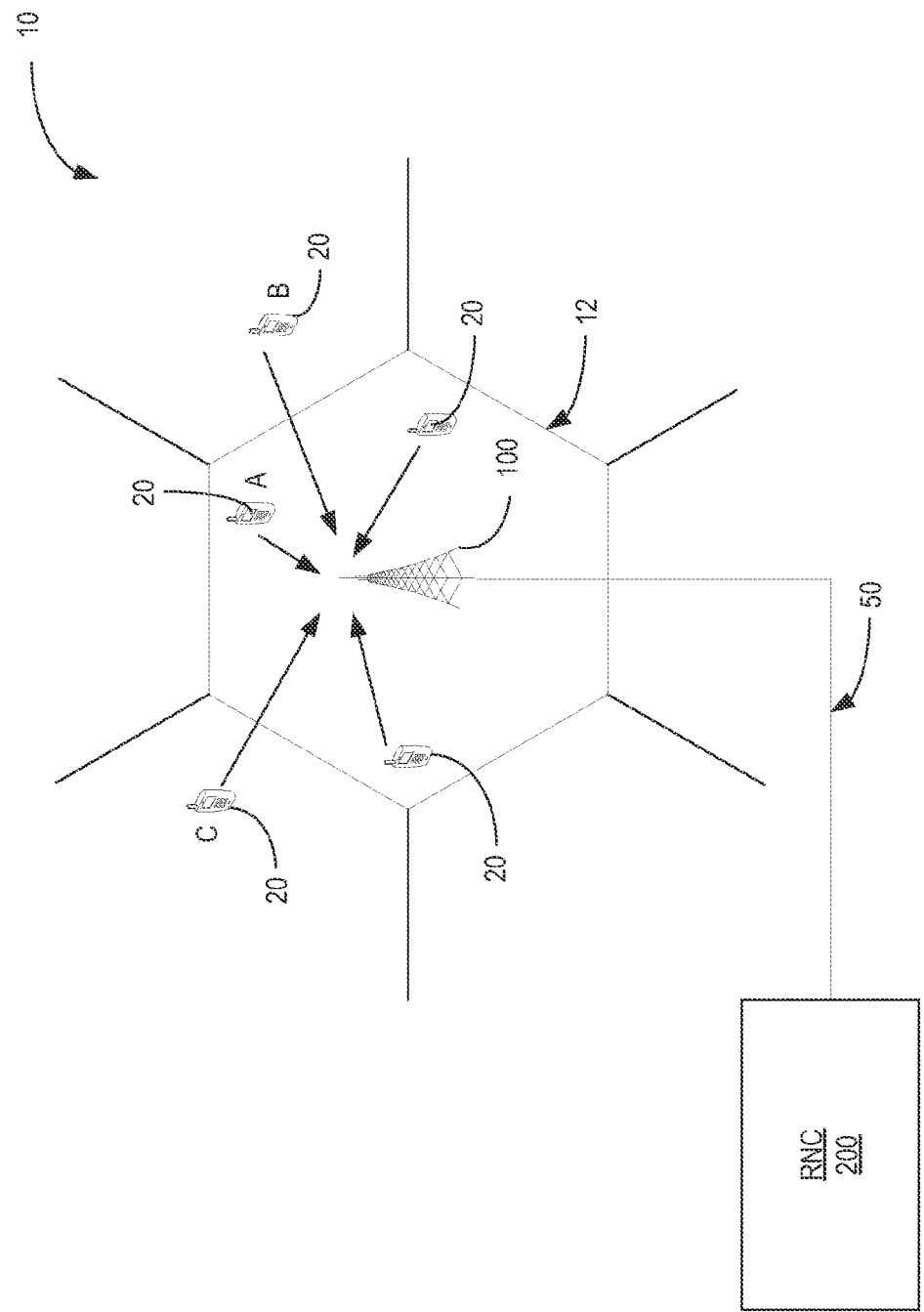
FIG. 1 shows a wireless network.

FIG. 1 shows an RBS 100 communicatively coupled to an RNC 200 in a mobile communication network 10 via an interface 50, which may comprise a wireless or a wired interface 50. RBS 100 provides service to a plurality of user terminals 20 within a cell 12 served by the RBS 100. The RBS 100 receives signals of interest from the mobile terminals 20 on an uplink (UL) channel, and also receives interfering signals from user terminals 20 in neighboring cells. Thus, for example, mobile terminal "A" would likely experience interfering signals from mobile terminals "B" and "C" which reside in neighboring cells. In WCDMA systems, the RBS 100 controls the transmit power of the mobile terminal 20 over the UL channel so that the received signal power from each mobile terminal 20 is approximately equal. While not explicitly shown in FIG. 1, the RBS 100 in FIG. 1 may alternatively represent a Location Management Unit (LMU). It will be appreciated that operations herein attributed to the RBS 100 may alternatively be implemented in LMU.

Exemplary embodiments will be described herein in terms of a Wideband Code Division Multiple Access (WCDMA) Heterogeneous Network (HETNET). Those skilled in the art will appreciate, however, that the method(s) and apparatus(es) disclosed herein are more generally applicable to any wireless communication systems that signal and manage interference suppressed information.

Figure 2:
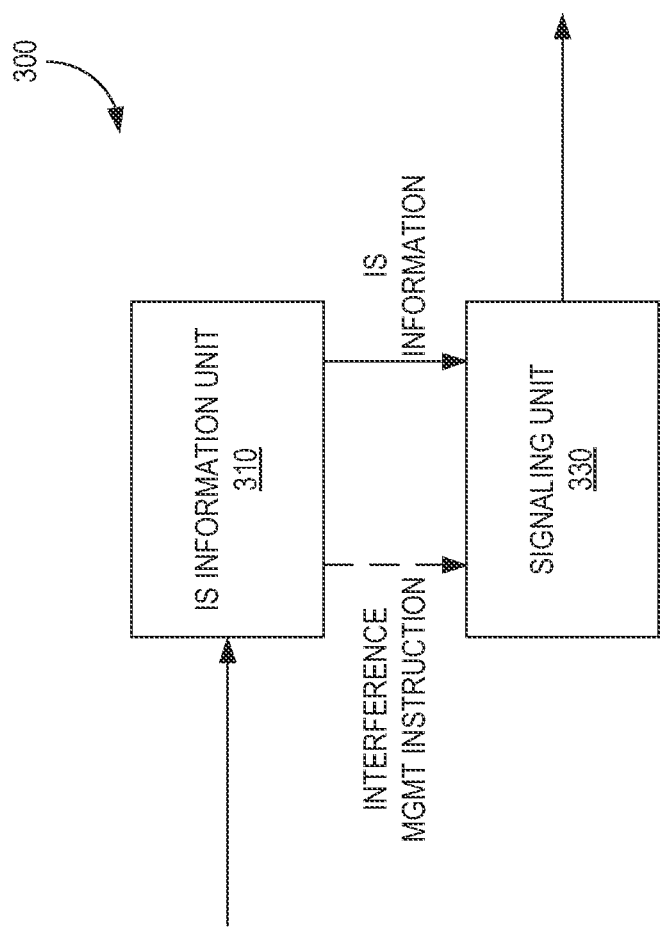
FIG. 2 shows an exemplary network node for the wireless network.

FIG. 2 shows an exemplary network node 300, which comprises one of the RBS 100 and the RNC 200. Network node 300 comprises an interference suppression (IS) information unit 310 and a signaling unit 330. Generally, IS information unit 310 determines interference suppressed information comprising at least one of an interference suppressed load or interference suppressed overload indicator, an interference suppressed neighbor cell interference, and an interference suppressed noise floor associated with an RBS 100 in the wireless network. Subsequently, the signaling unit 330 signals the interference suppressed information to a remote node in the wireless network via an interface 50 communicatively coupling the network node 300 to the remote node. For example, the signaling unit 330 may signal the interference suppressed load in terms of an interference suppressed rise-over-thermal, or in terms of an interference suppressed noise rise determined based on the interference suppressed neighbor cell interference. Alternatively or additionally, the signaling unit 330 may signal a total wideband cell power in terms of the interference suppressed noise floor, or may signal the interference suppressed neighbor cell interference.

Figure 3:
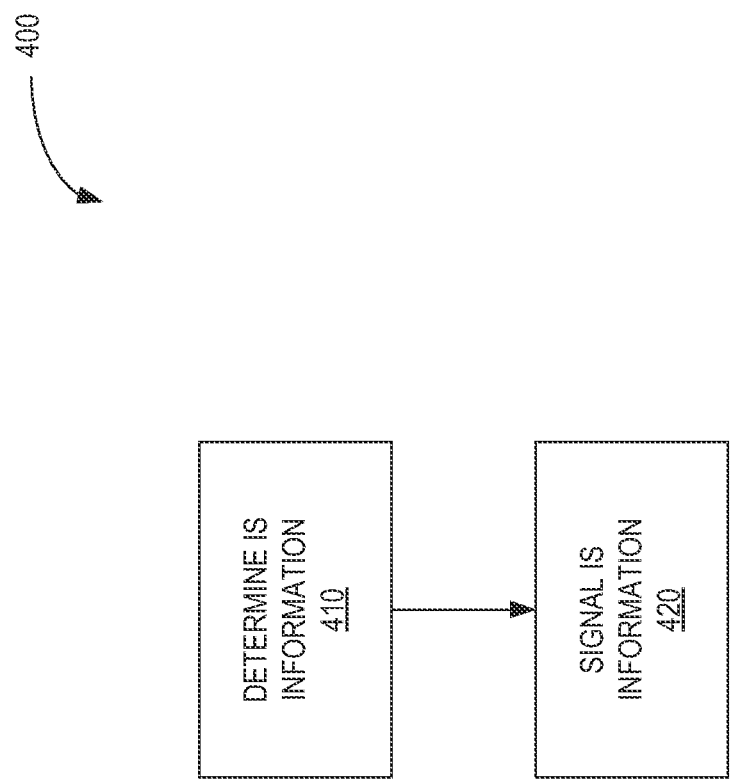
FIG. 3 shows an exemplary signaling method for the network node of FIG. 2.

FIG. 3 shows an exemplary method 400 for signaling the interference suppressed information between network nodes in a wireless network. The method 400 includes determining interference suppressed information (block 410), where the interference suppressed information includes an interference suppressed load or interference suppressed overload indicator, an interference suppressed neighbor cell interference, and/or an interference suppressed noise floor associated with a base station in the wireless network. For example, the interference suppressed information may be calculated at an RBS 100 or it may be requested and received by an RNC 200. The interference suppressed information is subsequently signaled from the network node 300 that determined the interference suppressed information to a remote network node in the wireless network via an interface (block 420). For example, when RBS 100 determines the interference suppressed information, the RBS 100 may signal the interference suppressed information to an RNC 200. Alternatively, when the RNC 200 determines the interference suppressed information, the RNC 200 may signal the interference suppressed information to an RBS 100 or another RNC 200. Appendix B provides a non-limiting list of examples of signaling operations.

While not required, the signaled information may be signaled for a subset of time and/or frequency domain resources, e.g., a subset of transmission time intervals (TTIs) and/or a subset of frequency sub-carriers. The subset of TTIs may be organized by, for example, node layers. For example, pico nodes may transmit in the first subset of TTIs and macro nodes may transmit in a second subset of TTIs, where the two subsets of TTIs may or may not overlap in time. In this case, an indicator, e.g., a carrier, a pattern reference/index, an indication of using specially designed as low-interference subframes, etc., may be transmitted together with the signaled interference suppressed information to indicate that the signaled information corresponds to a subset of resources. It will further be appreciated that different interference suppressed information may be obtained for and signaled for different TTIs.

Figure 4:
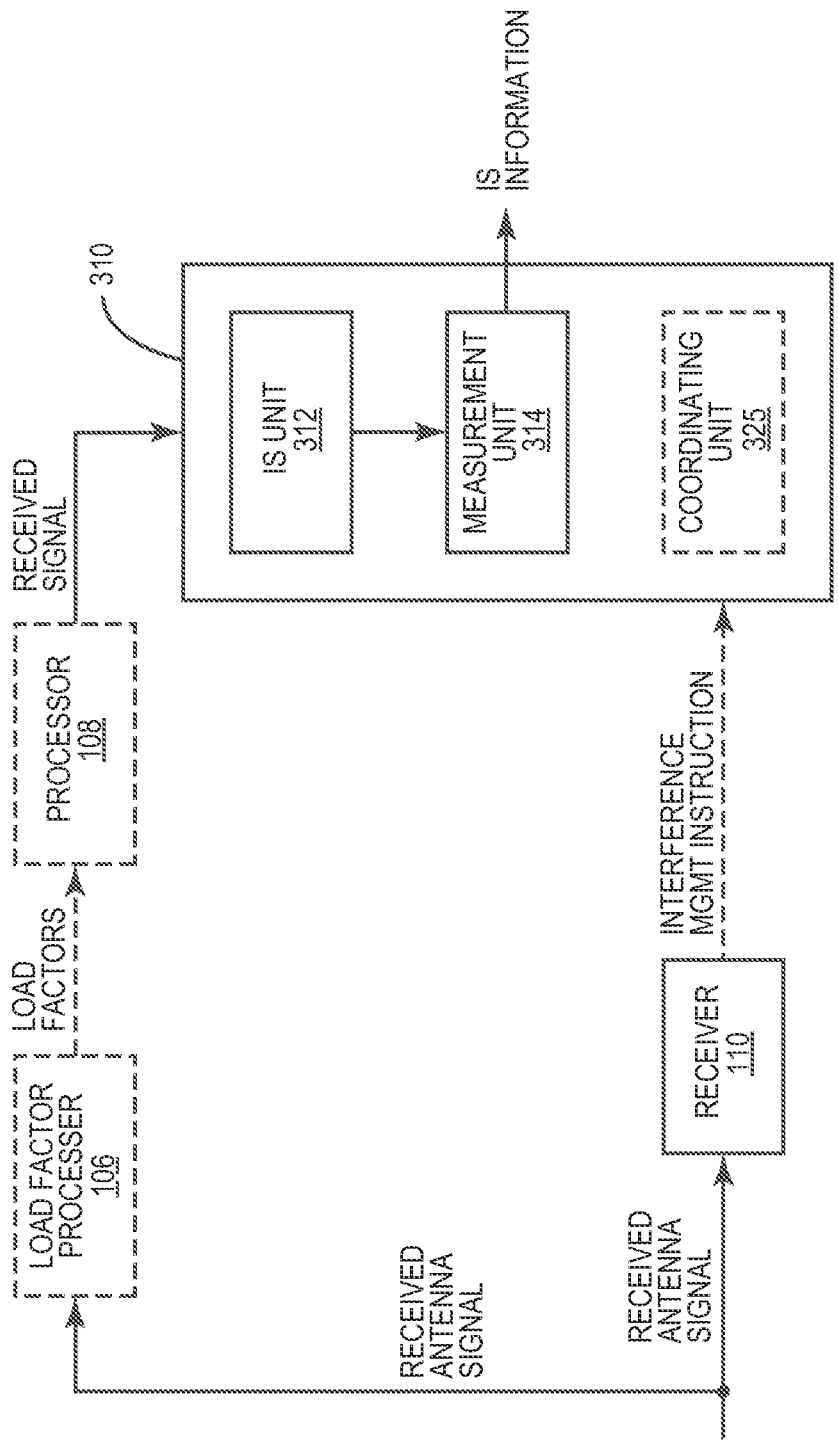
FIG. 4 shows an exemplary interference suppressed information unit for an RBS.

In one exemplary embodiment, the network node 300 comprises an RBS 100, and the remote network node comprises a network controlling node, e.g., RNC 200, an Operation and Maintenance (O&M) node, or a Self-Organizing Network (SON) node. Accordingly, FIG. 4 shows an exemplary IS information unit 310 for an RBS network node 300. In this embodiment, IS information unit 310 comprises an interference suppression unit 312 and a measurement unit 314. A receiver 110 in the RBS 100 processes an input signal provided by an antenna (not shown) to generate a received signal input to the IS unit 312. IS unit 312 suppresses interference from the received signal to determine an interference suppressed signal. Exemplary IS units 312 include, but are not limited to, G-RAKE+ units, frequency domain equalization units, and frequency domain pre-equalization units. Measurement unit 314 processes the interference suppressed signal to determine the interference suppressed information. For example, measurement unit 314 may determine an interference suppressed rise-over-thermal based on the interference suppressed signal to determine an interference suppressed load. Alternatively, the measurement unit 314 may determine interference-suppressed neighbor cell interference based on the interference suppressed signal to determine the interference suppressed load, and/or may determine an interference suppressed noise rise based on the interference suppressed neighbor cell interference. It will be appreciated that the IS information unit 310 in the RBS 100 may use any method for determining the interference suppressed information, including but not limited to those techniques disclosed in Appendices C-H. In another example, RBS 300 may comprise a multi-standard RBS, and the remote network node may comprise another RBS or a network node, e.g., a SON, O&M, etc. It will further be appreciated that the interference may be measured on a pre-defined time domain and/or frequency domain radio resources, which may be useful when, e.g., radio resources are divided into sets and the interference is different in different sets.

Responsive to the interference suppressed information determined by the IS information unit 310 in the RBS 100, the signaling unit 330 signals the interference suppressed information to the remote network node, e.g., the RNC 200, another RBS 100, etc. For example, to signal the interference suppressed information, the interface between the RBS 100 and the RNC 200, e.g., the Iub interface, may be augmented with Information Elements (IEs) used to signal the desired interference suppressed information. For example, the Common Measurement Report message and the Common Measurement Response message may be augmented with IEs. Alternatively or additionally, the desired interference suppressed information values may be encoded relative to the noise power floor given by the Reference Received Total Wideband Power IE in the same message. In this case, the interference suppressed information would be encoded in dBs in the same manner as the existing IE for the Received Total Wideband Power (RTWP). In another embodiment, the desired interference suppressed information values may be encoded as the existing IE Received Scheduled E-DCH Power Shared (RSEPS), which uses a relative coding to RTWP. The encoding could alternatively be made relative to a new Reference Received Total Wideband Power after interference suppressions, provided such an IE is standardized according to the implementation disclosed herein. Alternatively, the interference suppressed information may be transparently signaled between RBSs 100 via a user terminal 20. In still another embodiment, when the RBS 100 comprises a multi-RAT or multi-standard RBS, the interference suppressed information may be signaled from the RBS 100 using single-RAT or specific multi-RAT interfaces, per RAT and per cell.

Figure 5:
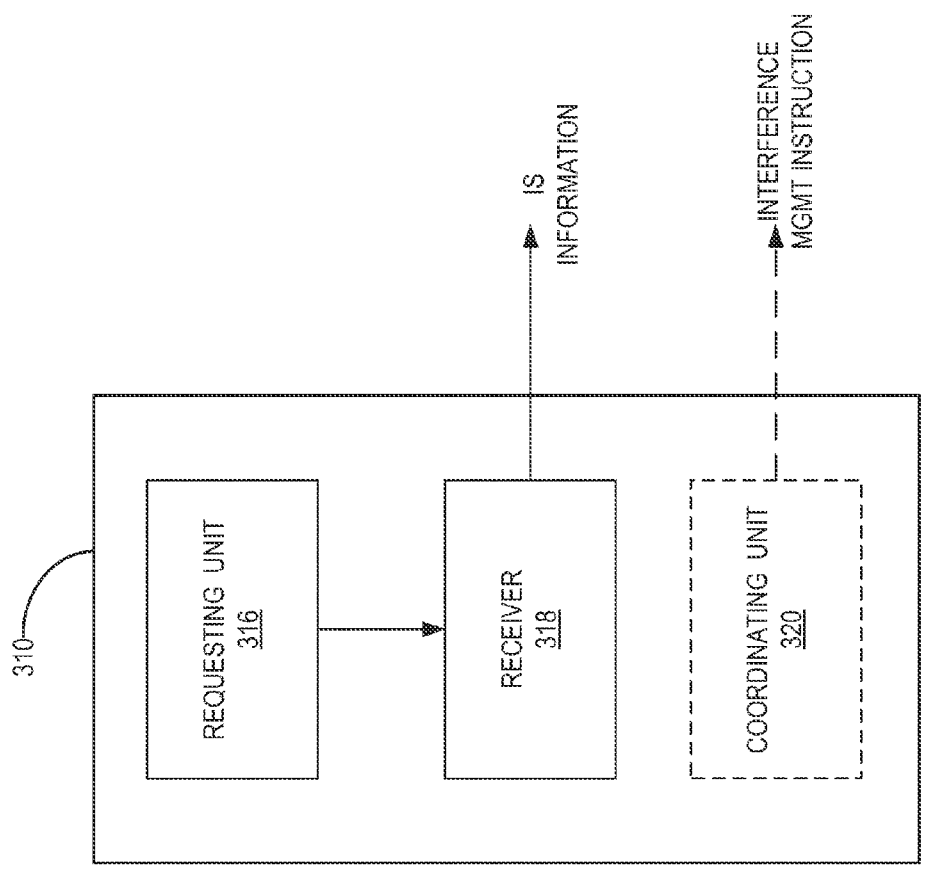
FIG. 5 shows an exemplary interference suppressed information unit for an RNC.

In another exemplary embodiment, the network node 300 comprises an RNC 200, and the remote network node comprises an RBS 100 or a network controlling node, e.g., another RNC 200, O&M node, or a SON node. Accordingly, FIG. 5 shows an exemplary IS information unit 310 when the network node 300 comprises the RNC 200. In this embodiment, IS information unit 310 comprises a requesting unit 316 and a receiver 318. The requesting unit 316 sends a request for the interference suppressed information to a RBS 100, while the receiver 318 receives the requested interference suppressed information from the RBS 100. For example, the requesting unit 316 may request the interference suppressed information by sending a Common Measurement Type message that includes a corresponding indicator. The request may indicate that the interference suppressed information should be reported periodically to the RNC 200, or may be event triggered. Further, the request may be specific to each cell 12 or to each RBS 100 in a cell 12.

Responsive to the interference suppressed information determined by the IS information unit 310 in the RNC 200, the signaling unit 330 signals the interference suppressed information to the remote network node, e.g., another RNC 200, the RBS 100 that provided the interference suppressed information, another RBS 100, etc. For example, to signal the interference suppressed information between two controlling nodes, e.g., between two RNCs 200, the Common Measurement Report message and the Common Measurement Response message may be augmented with IEs for signaling any one or more of the interference suppressed information values. To signal the interference suppressed information from the RNC 200 to an RBS 100, the Iub interface may be used. In still another embodiment, when the RBS 100 comprises a multi-RAT or multi-standard RBS, the interference suppressed information may be signaled from the RNC 200 to the RBS 100 using single-RAT or specific multi-RAT interfaces, per RAT and per cell.

Network node 300 may also implement management operations directed to controlling various communication parameters, e.g., power control, load threshold control, etc., based on the interference suppressed information. In this case, the network node 300 may additionally comprise a coordinating node, e.g., an RNC 200, an O&M node, a SON, or a coordinating Radio Resource Management (RRM) node, where the IS information unit 310 in the coordinating node includes a coordinating unit 320, as shown in FIG. 5, that further processes the received interference suppressed information to generate an interference management instruction. The signaling unit 330 subsequently signals the interference management instruction to an RBS 100 in the network 10, e.g., the RBS 100 that calculated the interference suppressed information and/or another RBS 100. In this case, the RBS 100 may also include a management unit 325 (FIG. 4), where the receiver 110 provides the received interference management instruction to the coordinating unit 325, and the coordinating unit 325 executes the received interference management instruction. For example, the coordinating unit 325 may implement power control, admission control, congestion control, scheduling control handover control, and/or load balancing control responsive to the interference management instruction. While not required, the signaled management instruction may be obtained from interference suppressed information determined for a subset of time and/or frequency domain resources, e.g., a subset of transmission time intervals and/or a subset of frequency sub-carriers. When the RBS 100 comprises a multi-RAT or multi-standard RBS, the signaled management instruction may be used by joint functional blocks, e.g., for multi-RAT admission control, scheduling, load balancing, interference management, or power sharing. Appendix I provides a non-limiting list of examples of coordinating operations.

In one exemplary embodiment, the interference suppressed information includes the uplink neighbor cell interference and/or uplink load estimates after interference suppression, where the RBS 100 adjusts the maximum downlink transmit power based on this interference suppressed information. In this example, the downlink power control may be implemented dynamically, and may also be used for power sharing in multi-RAT and/or multi-standard RBSs 100. One advantage of such downlink power control is that such downlink power control can be done autonomously by a radio network node 100, e.g., home NodeB. This advantage is based on the observation that the estimated high uplink interference at a radio network node 100 with small coverage may indicate the presence of a nearby mobile terminal 20 transmitting at a high power when, e.g., being served by a large neighbor cell, e.g. a macro cell. Some decision examples for adjusting the transmit power of the radio network node 100 with small coverage are, e.g., reducing the transmit power of the radio network node 100 with small coverage in order to reduce the interference in the downlink to the nearby mobile terminals 20. Alternatively, if the load of the radio network node 100 with small coverage allows, e.g. is not too high, then in some examples it may be better to increase the coverage of this radio network node 100, e.g., to increase its transmit power, to push away the cell boundary and get the nearby macro cell mobile terminal to reselect and get served to the adjusted radio network node 100, and thus avoid uplink interference at the radio network node 100 and downlink interference at the nearby mobile terminal 20. The power adjusting decision may also depend on whether the radio network node 100 with small coverage uses Closed-Subscriber Groups (CSGs) and whether the mobile terminal 20 belongs to that group.

In another exemplary embodiment, the interference suppressed information may be used to decide a configuration subset of time resources e.g., the density of blank or low interference time instances. Such resources may be configured, for example, in less loaded cells to temporarily improve interference conditions in a highly loaded or relatively weak (e.g., pica) neighbor cell, or in CSG cells to reduce interference to non-CSG terminals in the corresponding coverage area. The configuration of the time resources may be performed by the RNC 200 or the RBS 100. Further, the configuration of the time resources may be performed by a centralized node, such as the O&M and subsequently distributed to other network nodes.

In still another exemplary embodiment, the interference suppressed information may be used to set an overload indicator, which is subsequently signaled to a network node. The overload indicator may be set based on a comparison between the interference suppressed information and a pre-defined threshold, and may be signaled between any node, e.g., from the RBS 100 to the RNC 200, from the RNC 200 to a network controlling node, e.g., the O&M, between RBSs 100, etc. The overload indicator may also be transparently transmitted between RBSs 100 via a user terminal 20.

Figure 6:
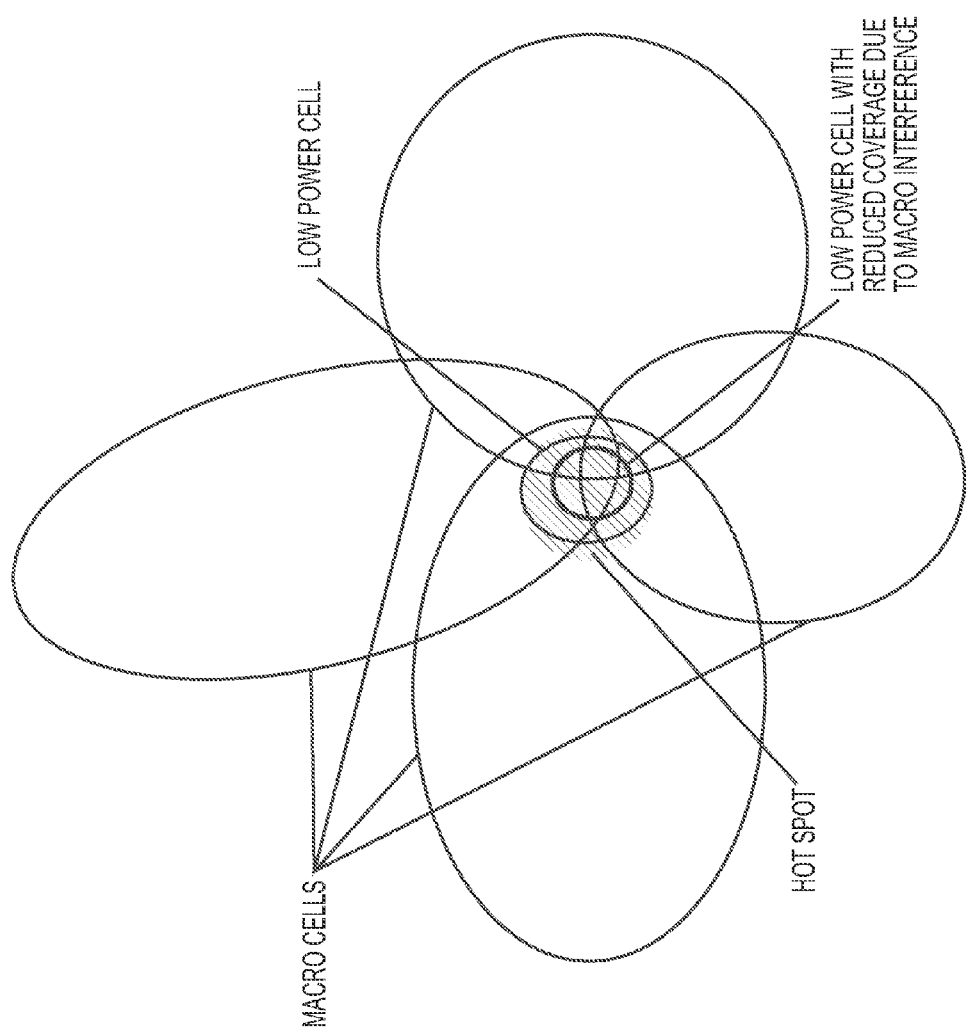
FIG. 6 shows an exemplary HETNET load management problem in WCDMA.
Figure 7:
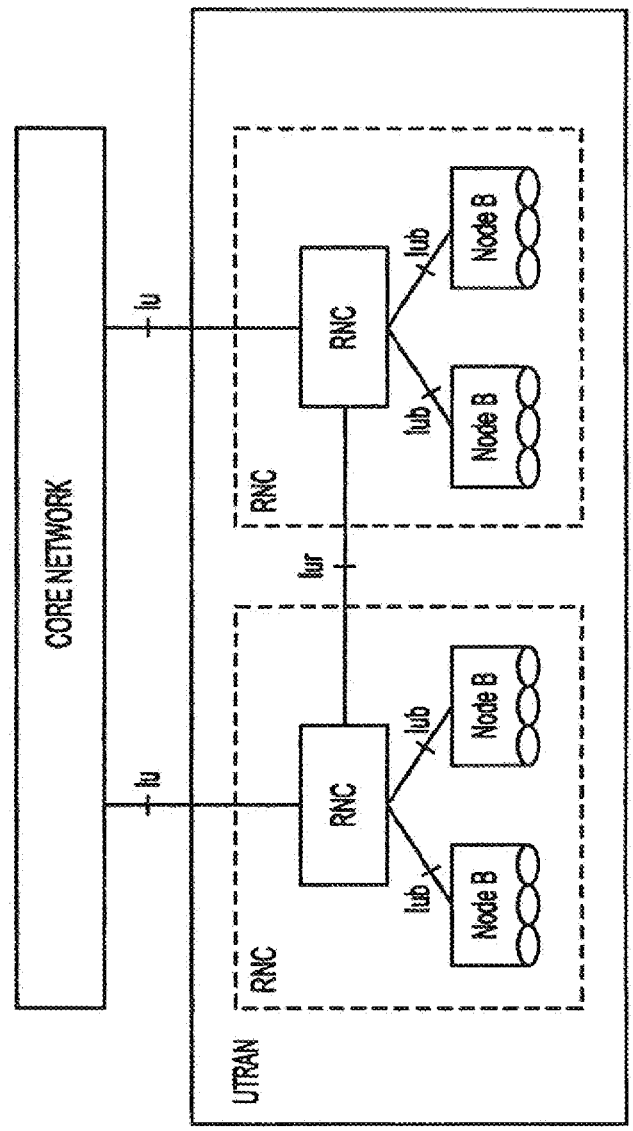
FIG. 7 shows an exemplary UTRAN architecture per 3GPP TS 25.401.
Figure 8:
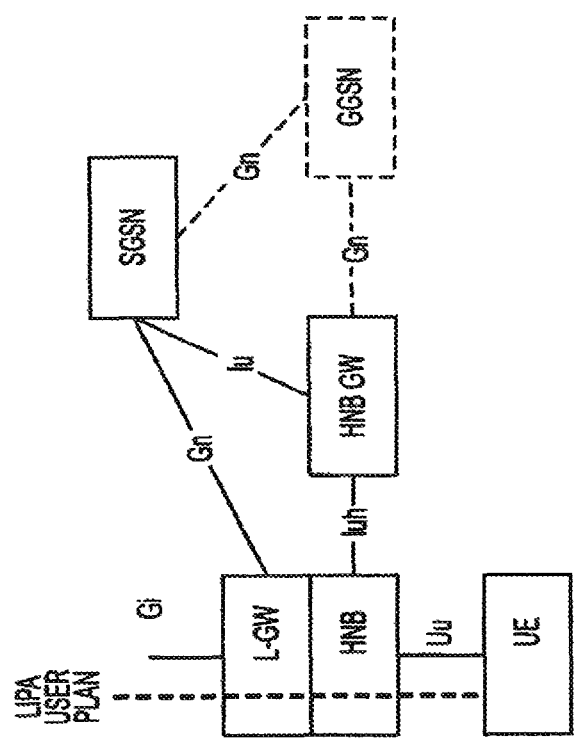
FIG. 8 shows an exemplary LIPA architecture for an HNB connected to a Gn-based SGSN per 3GPP TS 23.060.
Figure 9:
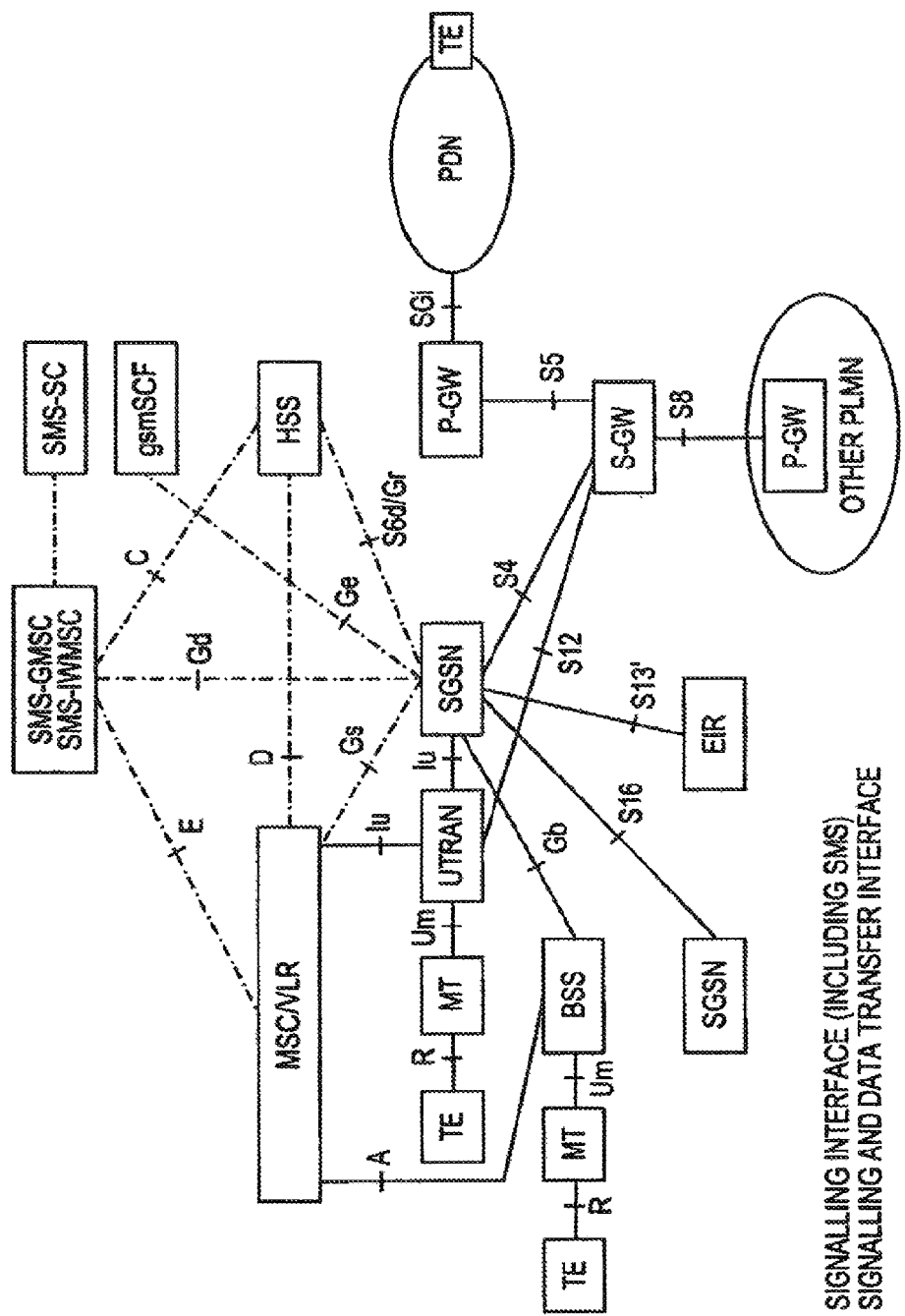
FIG. 9 shows an exemplary GPRS/UMTS architecture per 3GPP TS 23.060.
Figure 10:
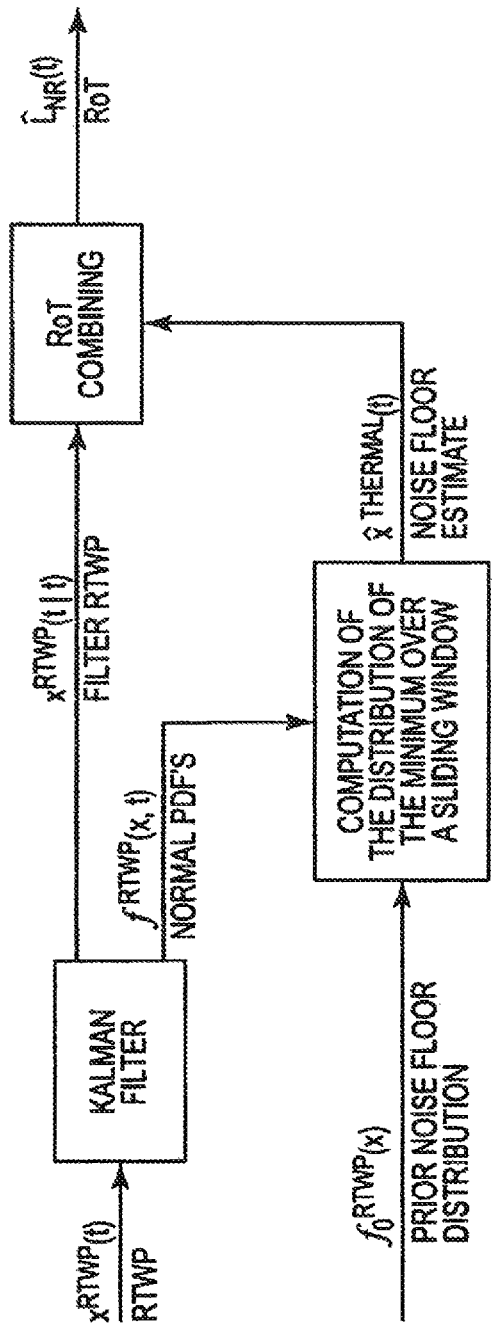
FIG. 10 shows an exemplary block diagram of a baseline RoT estimation algorithm.
Figure 11:
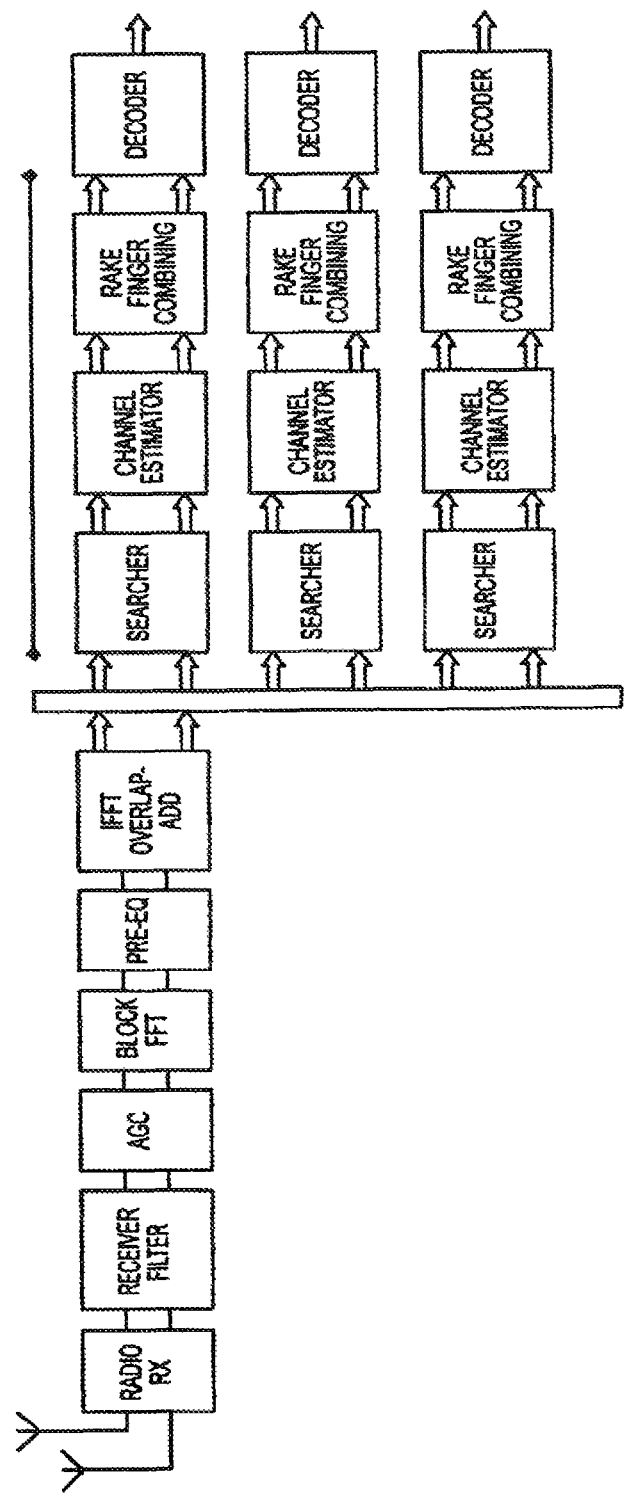
FIG. 11 shows a block diagram of an exemplary FDPE receiver structure.
Figure 12:
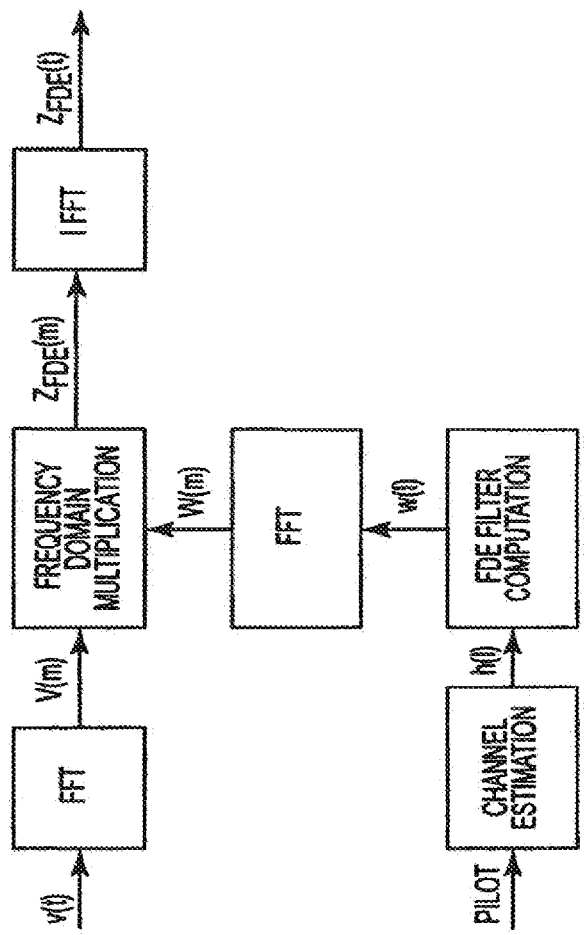
FIG. 12 shows a block diagram of an exemplary FDE structure.
Figure 13:
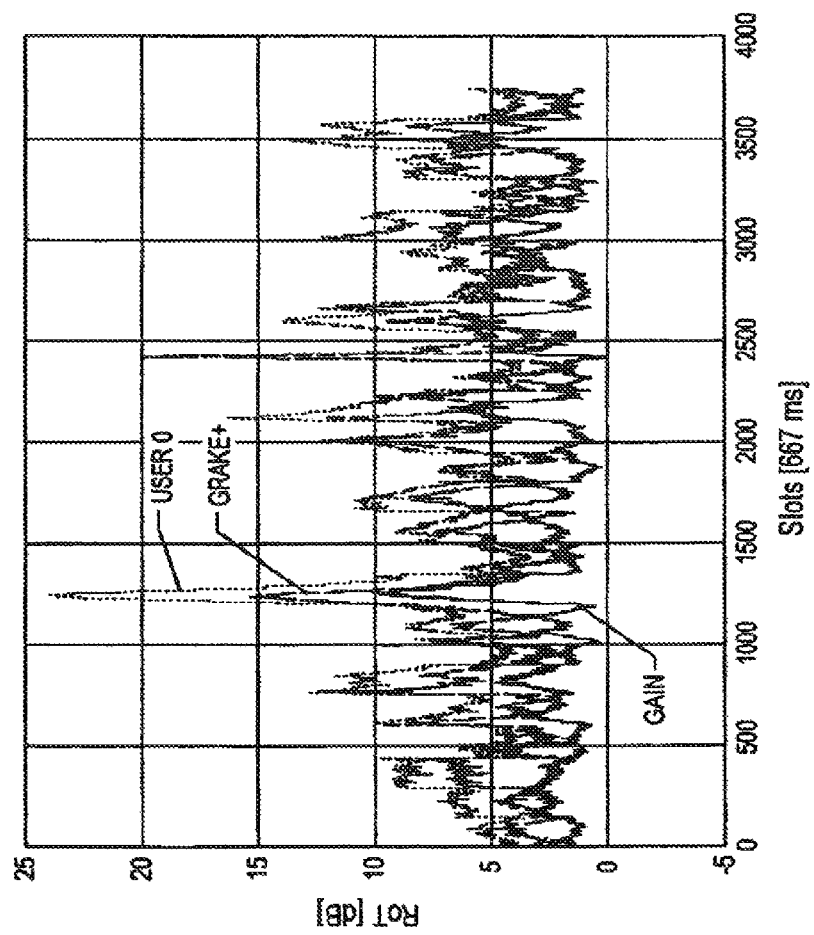
FIG. 13 shows the antenna RoT together with the RoT estimate and gain seen by user 0.
Figure 14:
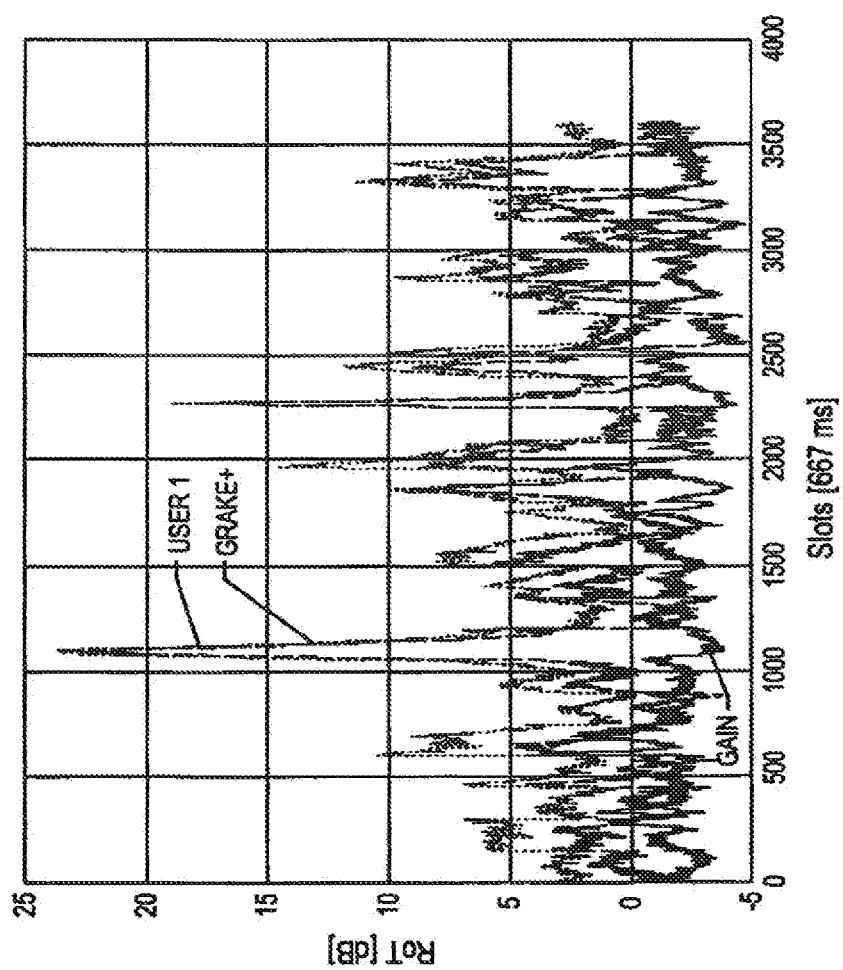
FIG. 14 shows the antenna RoT together with the RoT estimate and gain seen by user 1.
Figure 15:
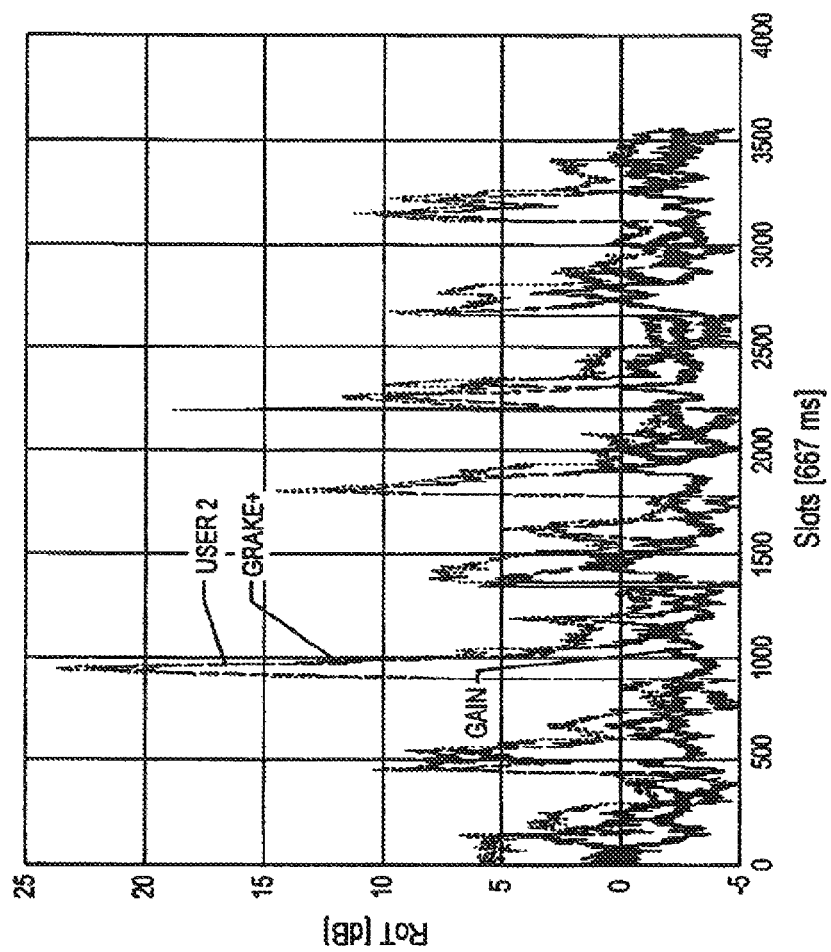
FIG. 15 shows the antenna RoT together with the RoT estimate and gain seen by user 2.
Figure 16:
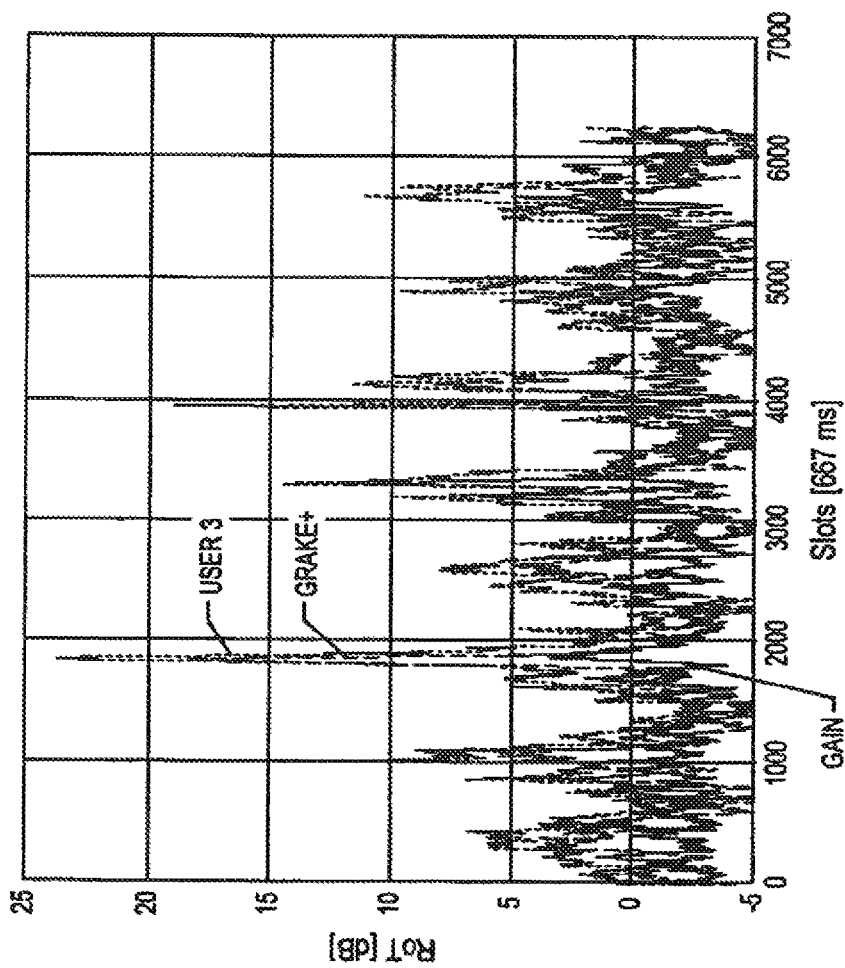
FIG. 16 shows the antenna RoT together with the RoT estimate and gain seen by user 3.
Figure 17:
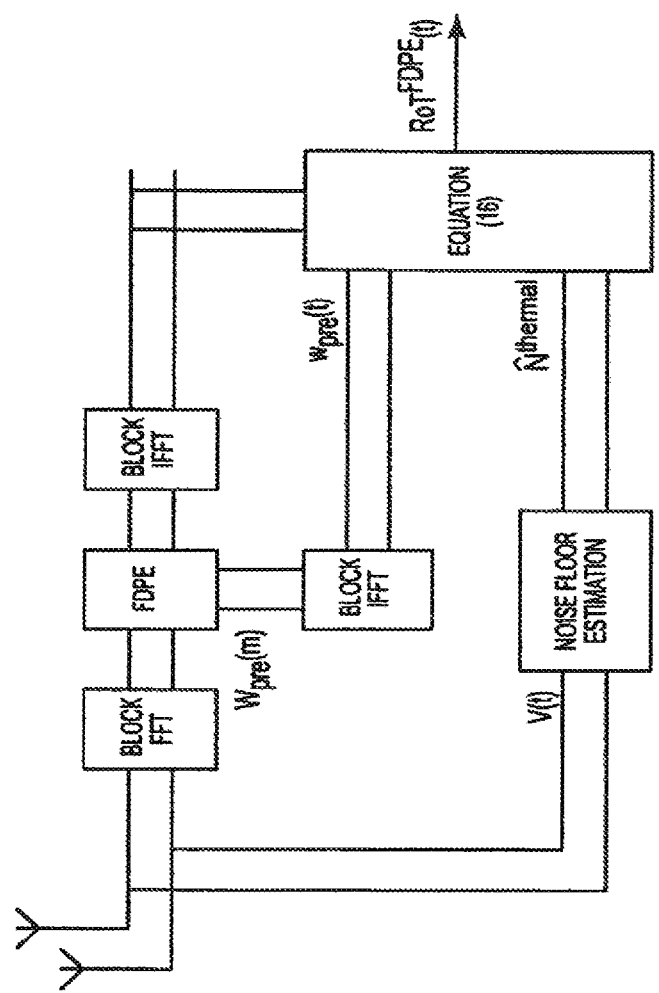
FIG. 17 shows an exemplary block diagram of a load estimation algorithm with FDPE.

The management operations generally address the previously described load interaction problems, which are shown in FIG. 6, which shows the reduced coverage of the center cell as a result of higher or overestimated interference, by executing the following exemplary algorithm, which is intended to be run consecutively in the background for the cells of the system. In one exemplary embodiment, the coordinating unit 320 in the RNC 200 coordinates management of the interference suppressed information by implementing the following:

1. Determine if the received interference suppressed rise-over-thermal is too high (indicating a loss of coverage. If not, proceed to step 5; else proceed to step 2.
2. Determine if the interference suppressed neighbor-cell interference is also too high. If not, proceed to step 2b; else proceed to step 2a.
    a. If the interference suppressed neighbor-cell interference is too high, proceed to step 4.
    b. If the interference suppressed own-cell interference is too high, proceed to step 3.
3. Use an algorithm to change the admission control threshold of the own-cell, to accept fewer user terminals 20 in the own cell (or to allocate another frequency carrier for a multi-RAT or multi-carrier system)) and shrink the coverage of this cell, with a first predefined step (in dBs). Proceed to step 5. In one example, the admission threshold may be any of the number of user terminals 20, the worst target service quality or GBR level, the lowest received signal strength, etc.
4. Use an algorithm to change the admission control thresholds of the surrounding cells, to admit fewer user terminals 20 in the surrounding neighbor cells and shrink their coverage areas.
    a. Check the own-cell noise rise level relevant for stability after interference suppression (not the RoT level which is corrupted by neighbor cell interference) of each of the surrounding cells, and select the surrounding with the highest value (most likely to cause problems).
    b. Generate a management instruction to reduce the admission control threshold of the surrounding cell with the highest value of the interference suppressed noise rise relevant for stability, with a second predefined step (in dBs) to accept fewer user terminals 20 in that cell 12 (or to allocate another frequency carrier for a multi-RAT or multi-carrier system) and shrink its coverage area.
    c. Mark the cell 12 as one with a reduced admission control threshold.
    d. Proceed to step 5.
5. In case the cell is marked as one with a reduced threshold, determine if the interference suppressed rise-over-thermal is too high. If it is too high, end; else proceed to step 6.
6. Generate a management instruction to increase the admission control threshold with a third predefined step (in dBs), maximally up to the pre-defined admission control threshold.

It will be appreciated that the above algorithm represents a typical non-limiting embodiment. Thus, other alternatives may be used.

Upon receipt of the interference management instruction from the RNC 200 at the RBS 100, the coordinating unit 325 in RBS 100 may execute the received interference management instruction. For example, coordinating unit 325 may:

1. Determine if the interference suppressed noise rise is among the predetermined number with the highest value of the cells signaled from the RNC 200, indicating that this RBS 100 is creating too much neighbor cell interference. If so, proceed to step 2; else proceed to step 3.
2. Reduce the scheduling threshold for the own UL load a first pre-determined step (in dBs). Mark the threshold as reduced. Start a timer during which increases of the threshold are blocked, where the scheduling threshold may be the number of scheduled user terminals 20 over a given period of time.
3. Determine if the scheduling threshold for the own UL load is marked as reduced, and if the interference suppressed noise figure is among the predetermined number with the highest value of the cells signaled from the RNC 200, indicating that this RBS 100 is still creating too much neighbor cell interference. If so, proceed to step 5; else proceed to step 4.
4. Determine if the scheduling threshold for the own UL load is marked as reduced. If the increase of the threshold is blocked, end; else proceed to step 5.
5. Increase the scheduling threshold for the own UL load a second predetermined step (in dBs), maximally up to the pre-defined or default scheduling threshold for the own UL load.

The signaling and/or management operations associated with interference suppressed information as disclosed herein provide previously unavailable information to any network node 300 in the wireless network. The RNC 200, for example, can then perform HETNET load management by the use of novel admission control algorithms. The RNC 200 can also signal the above information, valid for a specific cell ID to all surrounding RBSs, thereby allowing also RBSs to perform HETNET load management by the use of novel algorithms.

The interference suppressed information being signaled between network nodes and/or used for management operations is determined by the RBS 100. It will be appreciated that the RBS node may use any method for determining the interference suppressed information, including those techniques disclosed in Appendices C-H. The following provides one example for providing the interference suppressed information comprising interference suppressed neighbor cell interference estimation, which may, e.g., be implemented in the measurement unit 314.

First, the neighbor cell interference is estimated using the received signal before interference suppression. The idea is to modify a Kalman filter of a front end of a receiver so that the internally estimated state becomes the sum of neighbor cell interference and thermal noise. More particularly, the modified Kalman filter performs a joint estimation of the RTWP power, $P_{RTWP}(t)$, and the sum of the neighbor cell interference power and the thermal noise power floor, $P_{neighbor}(t)+P_N(t)$, before interference suppression. It will be appreciated that the modified Kalman filter may be implemented as part of the IS information unit 310. Alternatively, when receiver 110 comprises an interference suppression receiver, and the received signal output by receiver 110 comprises an interference suppressed received signal the modified Kalman filter may be implemented in a processing unit, e.g., processor 108, preceding the receiver 110 in the signal chain.

The modified Kalman filter performs the joint estimation using measurements of $P_{RTWP}(t)$ determined by the IS information unit 310, with a sampling rate of $T_{RTWP}=k_{RTWP}TTI$ for $k_{RTWP} \in Z+$, where $Z+$ represents a set of positive integers, and using computed own-cell load factors $L_{own}(t)$, with a sampling of $T_L(t)=k_L \in Z+$ for $k_L \in Z+$. For example, the own-cell load factors may be computed in a load factor processor 106 and input into processor 108. The IS information unit 310 subsequently selects the state as:

$$x_1(t)=P_{neighbor}(t)+P_N(t). \qquad (1)$$

The measured signal available for processing is $P_{RTWP}(t)$, which may be generated by process 108. The $L_{own}(t)$ is a computed quantity, e.g., based on signal-to-noise ratio measurements. For example, $L_{own}(t)$ may be computed according to:

$$L_{own} = \sum_{u=1}^{U} \frac{P_u}{P_{RTWP}} = \sum_{u=1}^{U} \frac{(C/I)_u}{1+(C/I)_u} \quad (2)$$

where $$(C/I)_u(t) = \frac{SINR_u(t)}{W_u} \frac{RxLoss}{G} \times \left(1 + \frac{\beta^2_{DPDCH,u}(t) + \beta^2_{EDPCCH,u}(t) + n_{codes,u}(t)\beta^2_{EDPDCH,u}(t) + \beta^2_{HSDPCCH,u}(t)}{\beta^2_{DPCCH}(t)}\right). \quad (3)$$

Here $W_u$ represents the spreading factor for user u, RxLoss represents missed receiver energy, G represents the diversity gain, and the β's represent the beta factors of the respective channels (assuming non-active channels have zero beta factors). A measured model of $P_{RTWP}(t)$ may then be generated in terms of the states, computed quantities, and a measurement uncertainty. To that end, Equation (2) is used together with a delay $T_D$ that models the scheduling loop delay of WCDMA to compute $P_{RTWP}(t)$ according to:

$$P_{RTWP}(t) = L_{own}(t-T_D)P_{RTWP}(t) + P_{neighbor}(t)P_N(t), \quad (4)$$

which results in:

$$P_{RTWP}(t) = \frac{1}{1 - L_{own}(t-T_D)}(P_{neighbor}(t) + P_N(t)). \quad (5)$$

After the addition of a zero-mean white measurement noise $e_{RTWP}(t)$ and replacement of variables by Equation (1), the following time variable measurement equation results:

$$y_{RTWP}(t) = \frac{x_1(t)}{1 - L_{own}(t-T_D)} + e_{RTWP}(t) \quad (6)$$

$$R_{2,RTWP}(t) = E|e^2_{RTWP}(t)|. \quad (7)$$

Here, $y_{RTWP}(t) = P_{RTWP}(t)$ and $R_{2,RTWP}(t)$ represents the scalar covariance matrix of $e_{RTWP}(t)$ Note: $L_{own}(t)$ is computed using both enhanced uplink and R99 traffic, and therefore, the delay is valid for both.

To set up the optimal filtering algorithm, it is necessary to generate a model for propagation of the state. This may be solved by postulating the most simple such model, e.g., a random walk as given by Equation (8), which is a standard statistical model often used in Kalman filtering.

$$x(t+T_{TTI}) \equiv x_1(t+T_m) = x_1(t) + w_1(t) \quad (8)$$

$$R_1(t) = E[w_1(t)]^2. \quad (9)$$

Here, $R_1(t)$ represents the covariance matrix of the zero mean white disturbance. The state space model behind the Kalman filter is:

$$x(t+T) = A(t)x(t) + B(t)u(t) + w(t) \quad (10)$$

$$y(t) = C(t)x(t) + e(t) \quad (11)$$

Here, x(t) represents the state vector, u(t) represents an input vector, y(t) represents an output measurement vector comprising the power measurements performed cell, e.g., the total received wideband power RTWP, w(t) represents the so-called systems noise that represents the modeled error, and e(t) represents the measurement error. The matrix A(t) represents the system matrix describing the dynamic modes, the matrix B(t) represents the input gain matrix, and the vector C(t) represents the measurement vector, which may be time varying. Finally, t represents the time and T represents the sampling period.

The general case with a time varying measurement vector is considered here. The Kalman filter is then given by the following matrix and vector iterations after the initialization, where the initialization is given by $t=t_0$, $\hat{x}(0|-1)=x_0$, and $P(0|-1)=P_0$.

$t=t+T$ $K_f(t)=P(t|t-T)C^T(t)(C(t)P(t|t-T)C^T(t)+R_2(t))^{-1}$ $\hat{x}(t|t)=\hat{x}(t|T)+K_f(t)(y(t)-C(t)\hat{x}(t|t-T))$ $P(t|t)=P(t|t-T)-K_f(t)C(t)P(t|t-T)$ $\hat{x}(t+T|t)=Ax(t|t)+Bu(t)$ $$P(t+T|t)=AP(t|t)A^T+R_1(t) \quad (12)$$

End where $\hat{x}(t|t-T)$ represents the state prediction based on data up to time t-T, $\hat{x}(t|t)$ represents the filter update based on data up to time t, P(t|t-T) represents the covariance matrix of the state prediction based on data up to time t-T, P(t|t) represents the covariance matrix of the filter update based on data up to time t, C(t) represents the measurement matrix, $K_f(f)$ represents the time variable Kalman gain matrix, $R_2(t)$ represents the measurement covariance matrix, and $R_1(t)$ represents the system noise covariance matrix. It will be appreciated that $R_1(t)$ and $R_2(t)$ often used as tuning variables for the filter. In principle, the bandwidth of the Kalman filter is controlled by the matrix quotient of $R_1(t)$ and $R_2(t)$.

The quantities of the Kalman filter for estimation of the sum of neighbor cell interference and noise power can now be defined. Using the state and measurement equations it follows that:

$$C(t) = \frac{1}{1 - L_{own}(t-T_D)} \quad (13)$$

$$R_2(t) = R_{2,RTWP}(t) = E[e^2_{RTWP}(t)] \quad (14)$$

$$A = 1 \quad (15)$$

$$B = 0 \quad (16)$$

$$R_1(t) = E[w_1(t)]^2. \quad (17)$$

The final processing step is provided by the algorithms for noise power floor estimation, which operate on the Gaussian distribution of the state $\hat{x}_1(t)$. Representing the estimated noise floor by $P_N(t)$, it follows that the estimated neighbor cell interference becomes:

$$\hat{I}_{neighbor}(t) = \hat{P}_{neighbor}(t) = \hat{x}(t) - P_N(t). \quad (18)$$

As explained in Appendix D, and particularly Equation D2, the interference suppressed neighbor cell interference via G-RAKE+ is obtained by scaling Equation (18) according to:

$$\hat{I}_{u,neighbor}^{G+} = w^H w \hat{I}_{neighbor} \quad (19)$$

In Equation (19), the user dependence shown in Equation D2 has been removed because Equation (18) is obtained for the complete cell. Similar expressions may be obtained for the FDE and FDPE by using the neighbor cell interference before interference suppression in Equations H3 and F3, respectively. The interference suppressed noise floor may be computed in the baseband of the RBS 100 from a scale factor expressing the effect of the interference suppression and the noise floor calculated before interference suppression, e.g., as calculated in Equation (19).

In addition to signaling the interference suppressed information, the signaling unit 330 may also signal a network nodes' capability using a capability indication, where "capability" refers to the network node's ability to deal with various levels of interference and report the interference suppressed information. While not required, the capability indication may also indicate whether interference suppression has been applied to the reported information. In any event, such capability signaling may be especially beneficial in high-interference scenarios or heterogeneous network deployments, where network nodes 300 having different capabilities are deployed in the same area. It will be appreciated that the capability indication may be provided responsive to a request, or may be provided independent of a request, e.g., with a measurement reporting or when an RBS 100 registers with the network 10, and that the capability information may be signaled to any controlling network node 300, e.g., an RNC and/or an O&M. A controlling network node 300 may factor in the capability information with the interference suppressed information when making decisions about future wireless communications in the network 10.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A network node configured to signal interference suppressed information to one or more remote nodes in a wireless network, said interference suppressed information comprising information about the interference after interference suppression, the network node comprising:
    an information unit configured to determine the interference suppressed information comprising at least one of an interference suppressed load or interference suppressed overload indicator, an interference suppressed neighbor cell interference, and an interference suppressed noise floor associated with a cell of a radio network node in the wireless network; and
    a signaling unit configured to signal the interference suppressed information to a remote node in the wireless network via an interface communicatively coupling the network node to the remote node;
    wherein the interference suppressed information is computed at least from a scale factor comprising one of:
        Generalized Rake+ (G-RAKE+) combining weights;
        a Frequency Domain Pre-Equalizer wideband finite impulse response of a pre-equalizing filter in the time domain; and
        a Frequency Domain Equalizer wideband finite impulse response of an equalizing filter in the time domain.

2. The network node of claim 1 wherein the network node comprises the radio network node comprising one of a radio base station and a location measurement unit in the wireless network, said radio network node including a receiver configured to receive a signal, and wherein the information unit comprises:
    an interference suppression unit configured to suppress interference from the received signal to determine an interference suppressed signal; and
    a measurement unit configured to determine the interference suppressed information based on the interference suppressed signal.

3. The network node of claim 2 wherein the measurement unit is configured to determine the interference suppressed load by determining an interference suppressed rise-over-thermal based on the interference suppressed signal.

4. The network node of claim 2 wherein the measurement unit is configured to determine the interference suppressed load by determining the interference suppressed neighbor cell interference based on the interference suppressed signal, and determining an interference suppressed noise rise based on the interference suppressed neighbor cell interference, and wherein the signaling unit signals the interference suppressed information by signaling the interference suppressed load in terms of the interference suppressed noise rise.

5. The network node of claim 2 wherein the interference suppression unit comprises one of a Generalized Rake+ (G-RAKE+) unit, a frequency-domain equalization unit, or a frequency-domain pre-equalization unit.

6. The network node of claim 2 wherein the receiver is further configured to receive an interference management instruction derived by the remote node based on the interference suppressed information signaled to the remote network node, and wherein the network node further comprises a coordinating unit configured to execute the received interference management instruction.

7. The network node of claim 1 wherein the network node comprises a radio network controller, and wherein the information unit comprises:
    a requesting unit configured to request the interference suppressed information from a first radio network node; and
    a receiver configured to receive the requested interference suppressed information from the first radio network node.

8. The network node of claim 7 further comprising a coordinating unit configured to generate an interference management instruction based on the received interference suppressed information, and to signal the interference management instruction to the first radio network node.

9. The network node of claim 7 further comprising a coordinating unit configured to generate an interference management instruction based on the received interference suppressed information, wherein the signaling unit is further configured to signal the interference management instruction to a second radio network node.

10. The network node of claim 7 wherein the remote node comprises a second radio network controller, and wherein the signaling unit is configured to signal the interference suppressed information by signaling at least one of an interference suppressed rise over thermal and an interference suppressed noise rise to the second radio network controller.

11. The network node of claim 7 wherein the remote network node comprises a second radio network node.

12. The network node of claim 1 wherein the signaling unit is further configured to signal a capability indication indicating at least one of an ability of the network node to address interference, an ability of the network node to signal the interference suppressed information, and whether interference suppression has been applied to signaled information.

13. A method of signaling interference suppressed information comprising information about interference after interference suppression between network nodes in a wireless network, the method comprising:
   determining the interference suppressed information comprising at least one of an interference suppressed load or interference suppressed overload indicator, an interference suppressed neighbor cell interference, and an interference suppressed noise floor associated with a cell of a radio network node in the wireless network; and
   signaling the interference suppressed information to a remote network node in the wireless network via an interface communicatively coupling network node to the remote network node;
   wherein the interference suppressed information is computed at least from a scale factor comprising one of:
      Generalized Rake+ (G-RAKE+) combining weights;
      a Frequency Domain Pre-Equalizer wideband finite impulse response of a pre-equalizing filter in the time domain; and
      a Frequency Domain Equalizer wideband finite impulse response of an equalizing filter in the time domain.

14. The method of claim 13 wherein the network node comprises a radio network node comprising one of a radio base station and a location measurement unit in the wireless network, the method further comprising receiving a signal, wherein the determining the interference suppressed information comprises:
   suppressing interference from the received signal to determine an interference suppressed signal; and
   determining the interference suppressed information based on the interference suppressed signal.

15. The method of claim 14 further comprising measuring the interference on at least one of pre-defined time-domain radio resources and pre-defined frequency-domain radio resources.

16. The method of claim 14 wherein determining the interference suppressed load comprises determining an interference suppressed rise-over-thermal based on the interference suppressed signal.

17. The method of claim 14 wherein determining the interference suppressed load comprises determining the interference suppressed neighbor cell interference based on the interference suppressed signal, and determining an interference suppressed noise rise based on the interference suppressed neighbor cell interference, and wherein the signaling the interference suppressed information comprises signaling the interference suppressed load in terms of the interference suppressed noise rise.

18. The method of claim 14 further comprising adjusting downlink transmit power of the radio network node based on the interference suppressed information.

19. The method of claim 14 further comprising receiving an interference management instruction derived by the remote node based on the interference suppressed information signaled to the remote network node, and executing the received interference management instruction.

20. The method of claim 19 wherein the received interference management instruction comprises at least one of a power setting instruction, an admission control instruction, a congestion control instruction, a scheduling instruction, a handover instruction, and a load balancing instruction.

21. The method of claim 13 wherein the network node comprises a radio network controller, and wherein determining the interference suppressed information comprises:
   requesting the interference suppressed information from a first radio network node; and
   receiving the requested interference suppressed information from the first radio network node.

22. The method of claim 21 further comprising generating an interference management instruction based on the received interference suppressed information, and signaling the interference management instruction to at least one of the first radio network node and a second radio network node.

23. The method of claim 21 wherein the remote node comprises a second radio network controller.

24. The method of claim 21 wherein the remote network node comprises a second radio network node.

25. The method of claim 13 further comprising signaling a capability indication indicating at least one of an ability of the network node to address interference, an ability of the network node to signal the interference suppressed information, and whether interference suppression has been applied to signaled information.

26. A coordinating node configured to manage interference suppressed information comprising information about interference after interference suppression in a wireless network, the coordinating node comprising:
   a receiver to receive the interference suppressed information comprising at least one of an interference suppressed load or interference suppressed overload indicator, an interference suppressed neighbor cell interference, and an interference suppressed noise floor associated with a cell of a first radio network node in the wireless network from the first radio network node;
   a processor configured to process the interference suppressed information to generate an interference management instruction; and
   a signaling unit configured to signal the interference management instruction to one or more radio network nodes in the wireless network;
   wherein the interference suppressed information is computed at least from a scale factor comprising one of:
      Generalized Rake+ (G-RAKE+) combining weights;
      a Frequency Domain Pre-Equalizer wideband finite impulse response of a pre-equalizing filter in the time domain; and
      a Frequency Domain Equalizer wideband finite impulse response of an equalizing filter in the time domain.

27. The coordinating node of claim 26 wherein the one or more radio network nodes include the first radio network node.

28. The coordinating node of claim 26 wherein the interference management instruction comprises at least one of a power setting instruction, an admission control instruction, a congestion control instruction, a scheduling instruction, a handover instruction, and a load balancing instruction.

29. A method of managing interference suppressed information comprising information about interference after interference suppression in a wireless network, the method comprising:
   receiving the interference suppressed information comprising at least one of an interference suppressed load or interference suppressed overload indicator, an interference suppressed neighbor cell interference, and an interference suppressed noise floor associated with a cell of a first radio network node in the wireless network from the first radio network node;
   processing the interference suppressed information to generate an interference management instruction; and
   signaling the interference management instruction to one or more radio network nodes in the wireless network to control one or more interference management control settings at each of the radio network nodes;

wherein the interference suppressed information is computed at least from a scale factor comprising one of:
Generalized Rake+ (G-RAKE+) combining weights;
a Frequency Domain Pre-Equalizer wideband finite impulse response of a pre-equalizing filter in the time domain; and
a Frequency Domain Equalizer wideband finite impulse response of an equalizing filter in the time domain.

30. The method of claim 29 wherein the one or more radio network nodes include the first radio network node.

31. The method of claim 29 wherein the interference management instruction comprises at least one of a power setting instruction, an admission control instruction, a congestion control instruction, a scheduling instruction, a handover instruction, and a load balancing instruction.

* * * * *

UNITED STATES PATENT AND TRADEMARK OFFICE
CERTIFICATE OF CORRECTION

PATENT NO. : 8,880,088 B2  
APPLICATION NO. : 13/376524  
DATED : November 4, 2014  
INVENTOR(S) : Wigren et al.

Page 1 of 2

It is certified that error appears in the above-identified patent and that said Letters Patent is hereby corrected as shown below:

In the specification

In Column 1, Line 61, delete "Pre-Equalize" and insert -- Pre-Equalizer --, therefor.

In Column 5, Line 5, delete "LMU." and insert -- an LMU. --, therefor.

In Column 5, Line 60, delete "pica" and insert -- pico --, therefor.

In Column 6, Line 34, delete "RBS 300" and insert -- RBS 100 --, therefor.

In Column 8, Line 24, delete "e.g." and insert -- e.g., --, therefor.

In Column 8, Line 31, delete "e.g." and insert -- e.g., --, therefor.

In Column 8, Line 44, delete "resources" and insert -- resources, --, therefor.

In Column 8, Line 48, delete "pica)" and insert -- pico) --, therefor.

In Column 9, Line 21, delete "system))" and insert -- system) --, therefor.

In Column 10, Line 59, delete "$T_{RTWP}=k_{RTWP}TTI$" and insert -- $T_{RTWP}(t)=k_{RTWP}TTI$ --, therefor.

In Column 10, Line 62, delete "$T_L(t)=k_L$" and insert -- $T_L(t)=k_L TTI$ for --, therefor.

In Column 11, Line 2, delete "process 108." and insert -- processor 108. --, therefor.

In Column 12, Line 1, delete "performed cell," and insert -- performed by the cell, --, therefor.

In Column 12, Line 20, delete "$\hat{x}(t|t)=\hat{x}(t|t|T)$" and insert -- $\hat{x}(t|t)=\hat{x}(t|t-T)$ --, therefor.

Signed and Sealed this  
Sixteenth Day of February, 2016

Michelle K. Lee  
*Director of the United States Patent and Trademark Office*

CERTIFICATE OF CORRECTION (continued)
U.S. Pat. No. 8,880,088 B2

In the specification

In Column 12, Line 33, delete "$K_f(f)$" and insert -- $K_f(t)$ --, therefor.

In Column 12, Line 37, delete "$R_2(t)$ often" and insert -- $R_2(t)$ are often --, therefor.